US011742970B1

(12) United States Patent
Cao et al.

(10) Patent No.: US 11,742,970 B1
(45) Date of Patent: Aug. 29, 2023

(54) CORRECTING ERROR VECTOR MAGNITUDE MEASUREMENTS

(71) Applicant: LitePoint Corporation, San Diego, CA (US)

(72) Inventors: Chen Cao, Shanghai (CN); Christian Volf Olgaard, Saratoga, CA (US); Ruizu Wang, Santa Clara, CA (US); Qingjie Lu, Shanghai (CN)

(73) Assignee: LITEPOINT CORPORATION, San Diego, CA (US)

( * ) Notice: Subject to any disclaimer, the term of this patent is extended or adjusted under 35 U.S.C. 154(b) by 0 days.

(21) Appl. No.: 17/875,782

(22) Filed: Jul. 28, 2022

(30) Foreign Application Priority Data

Jul. 21, 2022 (CN) .......................... 202210867015.2

(51) Int. Cl.
H04B 17/345 (2015.01)
H04B 1/04 (2006.01)
H04L 27/26 (2006.01)

(52) U.S. Cl.
CPC ......... H04B 17/345 (2015.01); H04B 1/0475 (2013.01); H04L 27/2614 (2013.01)

(58) Field of Classification Search
CPC . H04B 17/345; H04B 1/0475; H04L 27/2623; H04L 27/2614
USPC .......................... 375/148, 224, 346, 267, 308
See application file for complete search history.

(56) References Cited

U.S. PATENT DOCUMENTS 4,965,761 A 10/1990 Schlunt
5,412,325 A 5/1995 Meyers
6,268,735 B1 7/2001 Craig et al.
6,784,819 B2 8/2004 Chow
6,979,993 B2 12/2005 Kurosawa
7,343,558 B2 3/2008 Kadota
(Continued)

FOREIGN PATENT DOCUMENTS

EP 1260822 A2 11/2002
EP 1303064 A2 * 4/2003 ........... H04B 17/336
(Continued)

OTHER PUBLICATIONS

Alink et al., "A 50MHz-to-1.5GHz Crass—Correlation CMOS Spectum Analyzer for Cognitive Radio with 89dB SFDR in IMHz RBW," IEEE (2010), 6 pgs.
(Continued)

Primary Examiner — Emmanuel Bayard
(74) Attorney, Agent, or Firm — Burns & Levinson LLP

(57) ABSTRACT

An example test system includes memory (e.g., one or more memory devices) storing (i) instructions that are executable, and (ii) a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors. The test system also includes a decoder to receive a signal from a device under test, and to obtain a third EVM for a second symbol that is based on the signal, where the third EVM is corrupted by both RF noise and a symbol decoding error. One or more processing devices are configured to execute the instructions to adjust the third EVM using the mapping function to correct the symbol decoding error in the third EVM.

30 Claims, 11 Drawing Sheets

(56) References Cited

U.S. PATENT DOCUMENTS

| | | | |
|---|---|---|---|
| 7,719,451 | B2 | 5/2010 | Tamba |
| 7,990,418 | B2 | 8/2011 | Liu et al. |
| 8,036,298 | B2 * | 10/2011 | Kim .................. H04L 1/20 |
| | | | 375/267 |
| 8,064,550 | B2 | 11/2011 | Chrabieh et al. |
| 8,218,696 | B2 | 7/2012 | Rashid et al. |
| 8,255,183 | B1 | 8/2012 | Husted et al. |
| 8,680,852 | B2 | 3/2014 | Daly et al. |
| 9,442,148 | B2 | 9/2016 | Chow |
| 10,756,829 | B1 * | 8/2020 | Therrien ............ G06F 9/52 |
| 2002/0069038 | A1 * | 6/2002 | Cooper .............. H04L 1/0009 |
| | | | 702/191 |
| 2004/0001017 | A1 | 1/2004 | Chow |
| 2004/0100244 | A1 | 5/2004 | Kurosawa |
| 2005/0137814 | A1 | 6/2005 | Kelly et al. |
| 2005/0238094 | A1 | 10/2005 | Bessho et al. |
| 2006/0072656 | A1 * | 4/2006 | Wiss .................. H04L 1/20 |
| | | | 375/329 |
| 2007/0225927 | A1 | 9/2007 | Bessho et al. |
| 2008/0036865 | A1 | 2/2008 | Liu et al. |
| 2008/0219386 | A1 | 9/2008 | Chrabieh et al. |
| 2009/0082981 | A1 | 3/2009 | Muto |
| 2010/0040127 | A1 * | 2/2010 | Wen .................. H04L 1/0618 |
| | | | 375/232 |
| 2010/0283902 | A1 | 11/2010 | Rashid et al. |
| 2010/0327860 | A1 | 12/2010 | Daly et al. |
| 2011/0090944 | A1 * | 4/2011 | Kim .................. H04L 27/22 |
| | | | 375/334 |
| 2011/0235622 | A1 * | 9/2011 | Kash .................. H04L 5/0023 |
| | | | 375/227 |
| 2011/0309842 | A1 | 12/2011 | Behzad et al. |
| 2015/0124911 | A1 * | 5/2015 | Wicker, Jr. .......... H04L 25/0242 |
| | | | 375/340 |

FOREIGN PATENT DOCUMENTS

| | | | | |
|---|---|---|---|---|
| EP | 4068711 | A1 * | 10/2022 | ......... H04L 25/0224 |
| JP | H07-270464 | A | 10/1995 | |
| JP | 10-082812 | A | 1/1996 | |
| JP | 4060470 | B2 | 6/2000 | |
| JP | 2005-184407 | A | 7/2005 | |
| JP | 2005-308511 | A | 11/2005 | |
| JP | 2007-295257 | A | 11/2007 | |
| JP | 04-050783 | B1 | 2/2008 | |
| JP | 2008-122079 | A | 5/2008 | |
| JP | 4176479 | A | 11/2008 | |
| TW | 201008141 | A | 2/2010 | |

OTHER PUBLICATIONS

M. Sampietro, L. Fasoli, and G Ferrari, "Spectrum analyzer with noise reduction by cross—correlation technique on two channels", vol. 70, No. 5, May 1999.

* cited by examiner

CORRECTING ERROR VECTOR MAGNITUDE MEASUREMENTS

CROSS-REFERENCE TO RELATED APPLICATION

This application claims priority to Chinese Patent Application No. 202210867015.2, which was filed on Jul. 21, 2022. Chinese Patent Application No. 202210867015.2 is incorporated herein by reference.

TECHNICAL FIELD

This specification describes examples of systems for correcting error vector magnitude measurements.

BACKGROUND

Test systems are configured to test the operation of electronic devices. Testing may include sending signals to a device and determining how the device reacted to those signals based on its response. For example, testing may include sending test signals to a device, such as an integrated circuit (IC), and receiving radio frequency (RF) signals back from the device. The RF signals are processed to determine whether the device is performing acceptably. An error vector magnitude (EVM) is a measure of a quality of the signal received from the DUT.

SUMMARY

An example method is for use with symbols from encoding that is based on an amplitude and a phase of a carrier signal. The method may include the following operations: generating a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors; obtaining a third EVM for a second symbol, the third EVM being corrupted by both RF noise and a symbol decoding error; and adjusting the third EVM using the mapping function to correct the symbol decoding error in the third EVM.

The method may be implemented using one or more non-transitory machine readable media storing instructions that are executable by one or more processing devices to perform the foregoing operations. The method may include one or more of the following features, either alone or in combination.

The mapping function may include a look-up table (LUT) relating the first EVMs to the second EVMs for a type of encoding. Adjusting the third EVM may include selecting the LUT, selecting a second EVM in the LUT based on the third EVM, and replacing the third EVM with the first EVM corresponding to the selected second EVM. The type of encoding may include quadrature amplitude modulation.

The mapping function may be based on a simulation configured to perform operations that include: determining first values corresponding to the first EVMs based on versions of the first symbols that are uncorrupted by RF noise and versions of the first symbols that are corrupted by the RF noise; averaging sets of the first values to produce each first EVM; determining second values corresponding to the second EVMs based on the versions of the first symbols that are corrupted by the RF noise and versions of the first symbols that are corrupted by both the RF noise and the symbol decoding error; and averaging sets of the second values to produce each second EVM. Determining each first value may include adding RF noise to a select first symbol and determining a first value based on the select first symbol and the select first symbol with RF noise added. The first value may be an EVM for the select first symbol that would occur without a symbol decoding error. Adding the RF noise may include selecting random noise from a Gaussian distribution of noise and combining the random noise with the select first symbol. Determining each second value may include adding a symbol decoding error to the select first symbol with RF noise added and determining a second value based on the select first symbol with RF noise added and the select first symbol with both RF noise added and symbol decoding error. The second value may be an EVM for the select first symbol that would be occur with the symbol decoding error. The symbol decoding error may include false error that is based on one or more rules applied by a constellation decoder configured to decode symbols. At least one of the rules may require selection of a shortest error vector between an ideal symbol location on a constellation and the select first symbol with RF noise added.

The first symbols may be obtained by randomly sampling a data set from a normal distribution. The method may include storing the mapping function in a constellation decoder where the third EVM is adjusted.

An example method generates a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors. The method may include the following operations: determining first values corresponding to the first EVMs based on versions of the first symbols that are uncorrupted by RF noise and versions of the first symbols that are corrupted by the RF noise; averaging sets of the first values to produce each first EVM; determining second values corresponding to the second EVMs based on the versions of the first symbols that are corrupted by the RF noise and versions of the first symbols that are corrupted by both the RF noise and the symbol decoding error; averaging sets of the second values to produce each second EVM; and relating the first EVMs and the second EVMs.

The method may be implemented using one or more non-transitory machine readable media storing instructions that are executable by one or more processing devices to perform the foregoing operations. The method may include one or more of the following features, either alone or in combination.

The first symbols may be obtained by randomly sampling a data set from a normal distribution. The operations may include determining the versions of the first symbols that are corrupted by the RF noise by adding the RF noise to the first symbols. Adding the RF noise may include selecting random noise from a Gaussian distribution of noise and combining the random noise with each first symbol.

An example test system includes memory (e.g., one or more memory devices) storing (i) instructions that are executable, and (ii) a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors. The test system also includes a decoder to receive a signal from a device under test, and to obtain a third EVM for a second symbol that is based on the signal, where the third EVM is corrupted by both RF noise and a symbol decoding error. One or more processing devices are configured to execute the instructions to adjust the third EVM using the mapping function to correct the symbol decoding error in the third EVM.

The third EVM may be based on a symbol decoding error added by the decoder. The symbol decoding error may be based on at least one predefined rule implemented by the decoder.

Any two or more of the features described in this specification, including in this summary section, may be combined to form implementations not specifically described in this specification.

The various systems described herein, or portions thereof, may be implemented, at least in part, via a computer program product that includes instructions that are stored on one or more non-transitory machine-readable storage media and that are executable on one or more processing devices (e.g., microprocessor(s), application-specified integrated circuit(s), programmed logic such as field programmable gate array(s), or the like). The processes described herein, or portions thereof, may be implemented as an apparatus, method, or system that may include one or more processing devices and computer memory to store executable instructions to implement control of the stated functions. The devices, systems, processes, and/or components described herein may be configured, for example, through design, construction, arrangement, placement, programming, operation, activation, deactivation, and/or control.

The details of one or more implementations are set forth in the accompanying drawings and the following description. Other features and advantages will be apparent from the description and drawings, and from the claims.

DESCRIPTION OF THE DRAWINGS

Like reference numerals in different figures indicate like elements.

DETAILED DESCRIPTION

Described herein are example implementations of techniques, processes, and test systems, such as automatic test equipment (ATE) that are configured to correct error vector magnitude (EVM) measurements. An EVM is a measure of how accurately a device under test (DUT) transmits symbols within a constellation. An example constellation diagram includes a graphical representations of symbols transmitted using radio frequency (RF) signals. In this regard, digitally-modulated signals encode information using a sinusoidal carrier signal by mixing a sinusoidal carrier wave with a data signal. The data signal modifies the amplitude, the phase angle, or both the amplitude and the phase angle of the carrier signal to produce a modulated signal. The modulated signal includes a combination of amplitude and phase values. This combination of amplitude and phase values may represent symbols that are defined by one or more bits of data. These symbols correspond to points on a constellation diagram. The location of each point on the constellation diagram is based on the amplitude and the phase angle associated with its corresponding symbol.

Figure 1:
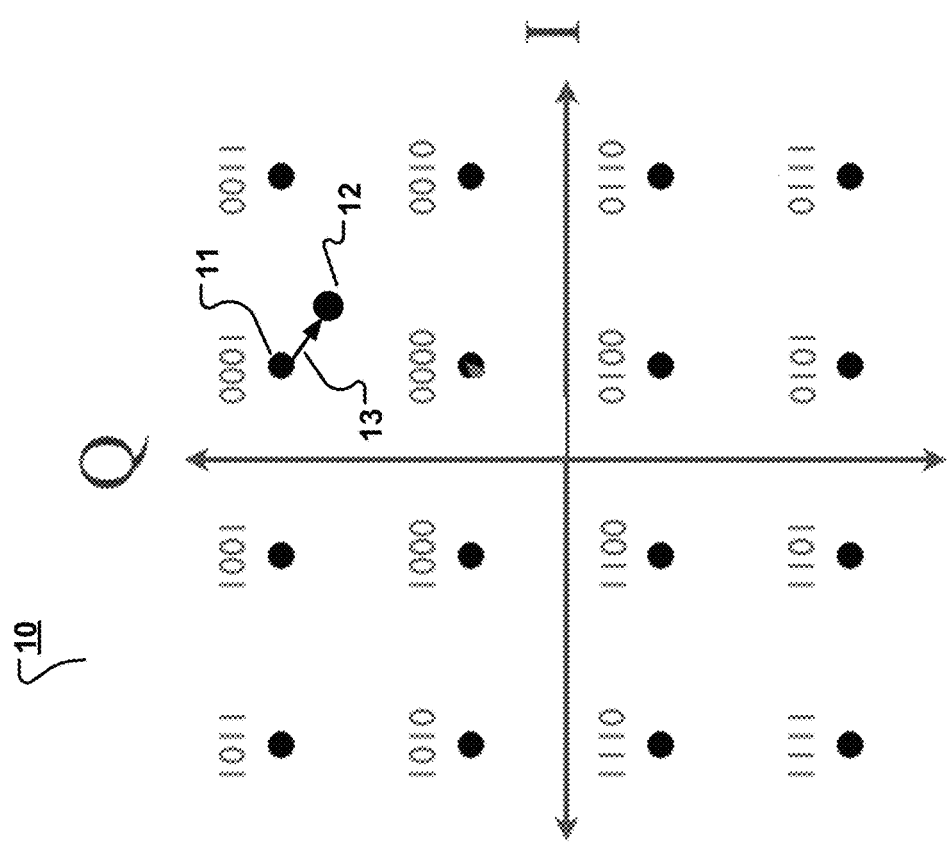
FIG. 1 is a constellation diagram showing an example error vector.

In the example constellation diagram 10 of FIG. 1, points representing four-bit symbols are arranged on a two-dimensional graph representing an inphase (I) and quadrature (Q) complex plane. In this example, each four-bit-labeled point, such as "1001", represents the ideal location of a symbol within that plane. However, in other examples, each point may represent an estimated location of an ideal point in the plane.

When received data is demodulated, a location of a symbol, such as "0001" represented by the data, is identified on the constellation diagram. In some cases, the location of a symbol represented by the data does not coincide with the ideal location of that symbol on the constellation diagram. For example, a symbol (0001) represented by the data may be located at point 12 on the constellation diagram. The difference between the ideal point 11 for "0001" and the measured point 12 constitutes an error, which may be due to noise in the RF signal upon which the data is based. This error may be determined relative to the closest predetermined point in the constellation diagram. An error vector 13 represents this difference in location between the predetermined and measured points. The magnitude of this vector 13 is the EVM.

A constellation decoder (or simply "decoder") is configured to implement rules to resolve potential errors in the constellation diagram. In the example partial constellation diagram 15 of FIG. 2, the ideal locations of symbols are at points 17, 18, 19, and 20, Due to errors resulting, for example, from RF noise, the constellation decoder places a symbol at location 22. The RF noise may include any noise-related characteristic such as, but not limited to, white noise, phase noise, or other types of signals not part of the data. Unbeknownst to the constellation decoder, the correct location of the symbol is at location 19. However, the decoder is programmed with a decoding rule that requires the EVM to be taken relative to the closest ideal symbol location on the constellation diagram. In this example, that location is 18, resulting in an EVM that is based on vector 24 instead of an EVM based on vector 25, which would be the correct basis for the EVM in this instance. The resulting EVM therefore contains an error, which is referred to herein as a false error or a symbol decoding error.

The example systems, techniques, and processes described herein address this false error, which may improve EVM measurement accuracy. Addressing the false error may include correcting the false error in whole or at least in part. The techniques and processes are described in the context of a test system, but are not limited to use with test systems or to use in a testing context.

Figure 3:
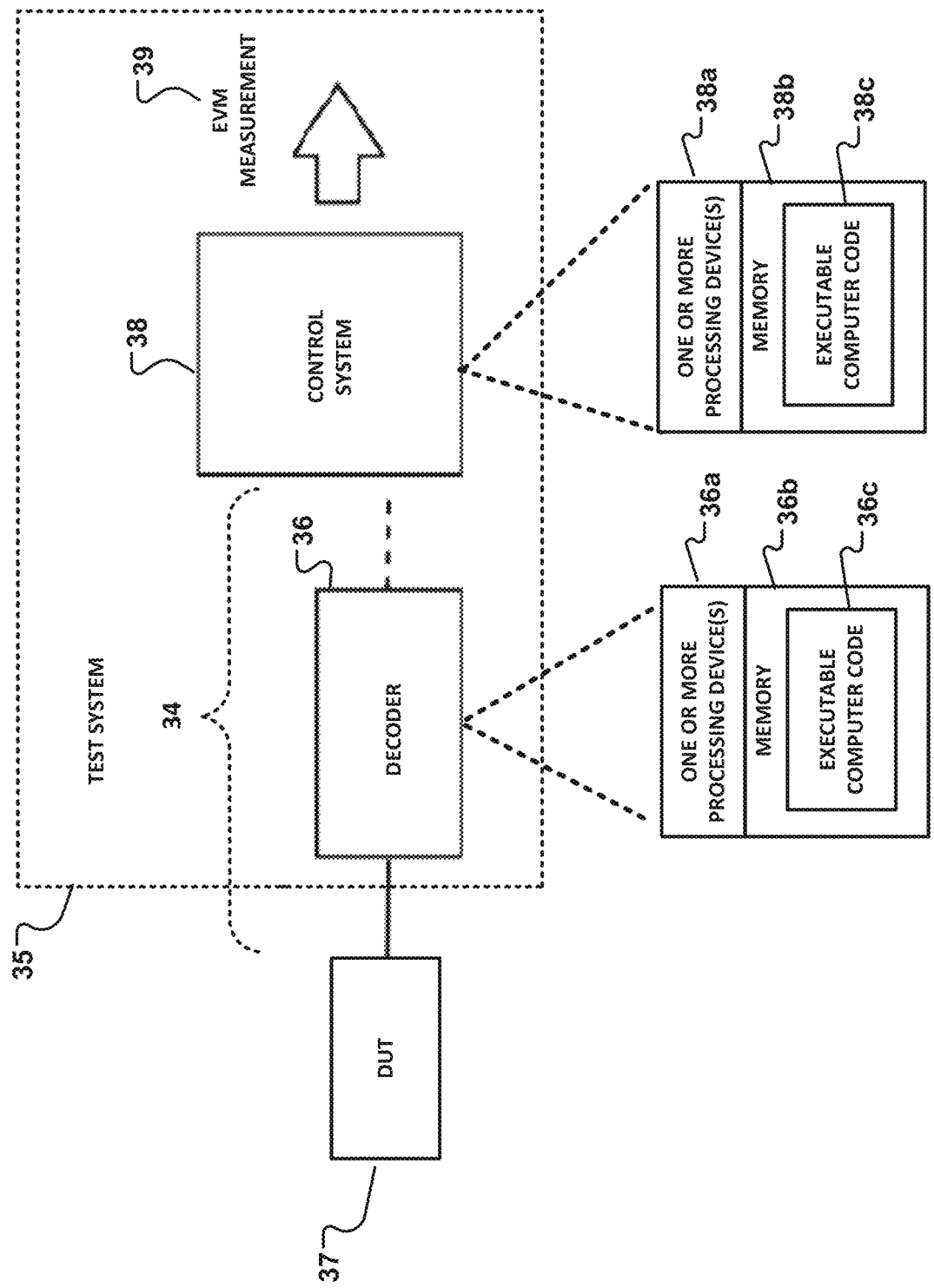
FIG. 3 is a block diagram showing components of an example test channel and showing components of an example test system.

FIG. 3 shows an example test channel ("channel") 34 of an example test system 35 or ATE. As shown in FIG. 3, channel 34 is configured to connect to a DUT 37, such as an 802.11 be Wi-Fi device or other type of device configured to transmit RF signals to the test system for analysis. Although an 802.11 be Wi-Fi device is mentioned, any type of DUT that outputs RF signals may be tested by the test system.

Channel 34 includes a decoder 36, which may be a hardware device configured to receive an input signal from the DUT and to output locations of symbols for placement on a constellation diagram or to output the constellation diagram itself. The input signal from the DUT may be a response to a test stimulus or independent of a test stimulus. The decoder may include one or more processing devices 36a, examples of which are described herein. The decoder also includes memory 36b storing computer code or instructions 36c that program the one or more processing devices 36a to perform all or some of the operations described below, including the processes described herein for addressing the false error. In some implementations, the processing devices and memory may be part of the control system 38, which is described below, and which may control operation of decoder 36 to implement all or part of processes described herein for addressing the false error.

Decoder 36 may be a constellation decoder and may also be configured—for example, programmed and/or controlled—to implement vector signal analyzer (VSA) functionality. An example vector signal analyzer is configured to measure a magnitude and phase of an input signal at a frequency that is within a bandwidth of the VSA. The VSA may also be configured to make in-channel signal measurements, including measuring the EVM of the input signal. The decoder may be configured—for example, programmed and/or controlled—with decoding rules such as, but not limited to, requiring the EVM to be determined relative to the closest ideal location on the constellation diagram for a symbol—for example, location 18 in FIG. 2.

Test system 35 also includes control system 38. Control system 38 may include one or more processing devices 38a, examples of which are described herein, and memory 38b storing computer code 38c or instructions that is/are executable to implement functionality such as correcting for noise or other sources of corruption in the EVM and outputting a corrected EVM measurement 39. Examples of processes that may be implemented by control system 38 are described in U.S. patent application Ser. No. 17/746,230, which was filed on May 17, 2022 and which is titled "Correcting Error Vector Magnitude Measurements". In some implementations, the computer code to implement the processes described herein for addressing the false error may be in the control system only and may be used to control the decoder. In some implementations, the computer code to implement the processes described herein for addressing the false error may be in the decoder only. In some implementations, the computer code to implement the processes described herein for addressing the false error may be distributed among the decoder and control system. In some implementations, the computer code to implement the processes described herein for addressing the false error may be in another part of the test system or external to the test system.

Figure 4:
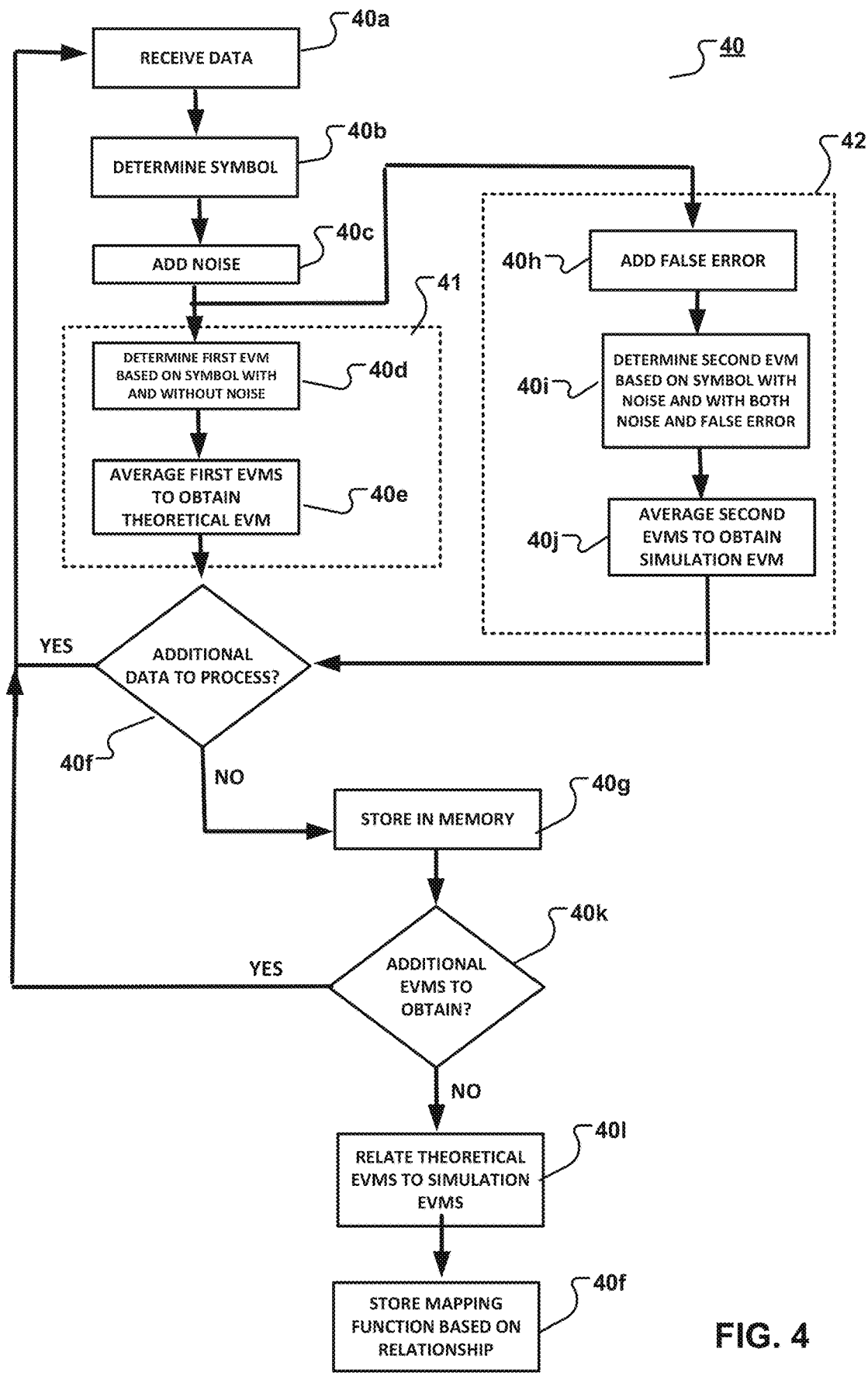
FIG. 4 is a flowchart showing an example process for generating a mapping function to address the false error in an EVM measurement.

The example processes for addressing false error include generating a mapping function that relates first EVMs for first symbols to second EVMs for the first symbols, where the first EVMs are corrupted by RF noise and the second EVMs are corrupted by both RF noise and false errors (that is, symbol decoding errors). Examples of the mapping function include, but are not limited to, a single-step function, a multiple-step transfer function, a look-up table (LUT), or a combination thereof. FIG. 4 shows operations included in an example process 40 for generating an example mapping function. These operations may be performed in computer software and are not repeated for each device tested. The operations are described with respect to block diagram 50 shown in FIG. 5. In this regard, block diagram 50 is a graphical representation of process 40 and represents a simulation implemented in computer software. Specifically, block diagram 50 represents a statistical process to build the mapping function that is based on simulated and randomly selected symbols, noise, and false error. Accordingly, the example systems, techniques, and processes described herein do not require prior information about specific packets used as reference data for the simulation.

Figure 5:
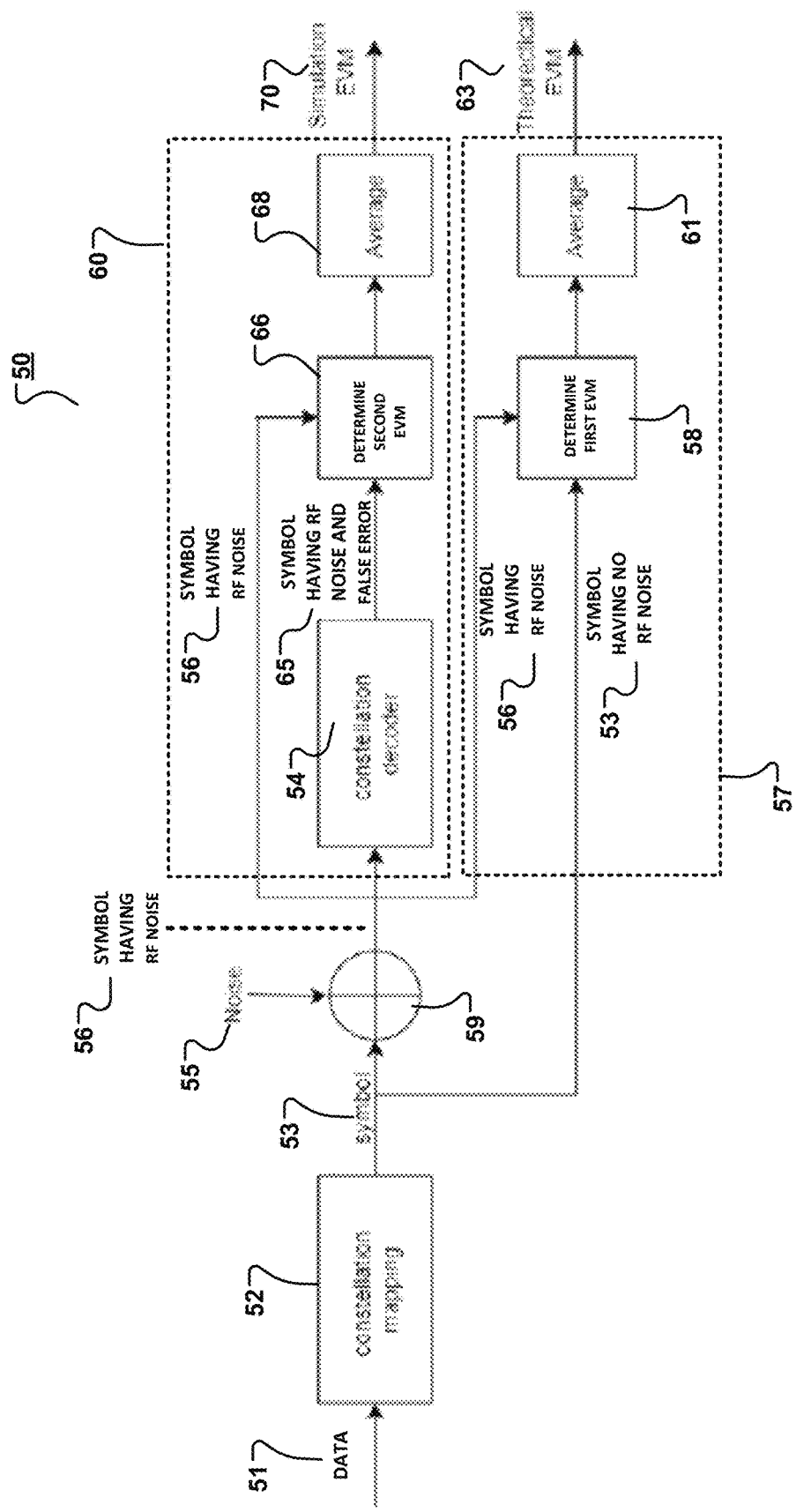
FIG. 5 is a block diagram showing the process of FIG. 4 graphically.

Referring to FIGS. 4 and 5, process 40 includes receiving (40a) data and determining (40b), based on the data, a symbol among a set of symbols for a predefined power level such as a signal-to-noise ratio (SNR) power for the signal for which the EVM is being determined. The SNR power may be based on vector signal generator (VSG) signal power. A VSG is or includes an electronic device that generates test vectors (e.g., electrical signals) having predefined properties, such as amplitude, frequency, and wave shape at different power levels, These generated test vectors are used as stimulus for device testing.

In the example of FIG. 5, data 51 is received at constellation mapping block 52, which determines the locations of a symbol 53 on a constellation diagram. The data may represent DUT signals and may be obtained and received by randomly sampling a data set from a predefined normal distribution of symbols for a predefined power level, such as an SNR power level for a corresponding signal. The predefined normal distribution and power level may be determined using prior test results. Any appropriate sampling technique may be used including, but not limited to, the Monte Carlo sampling technique. Generally, the Monte Carlo sampling technique includes defining a domain of possible inputs and generating inputs randomly from a probability distribution—in this example, a normal distribution—over the domain.

At block 59, noise 55 such as RF noise is added (40c) to data for symbol 53. Adding the RF noise may include selecting random noise from a Gaussian distribution of noise and combining the selected random noise with the data for the symbol, The result is a symbol 56 having RF noise added thereto.

Figure 2:
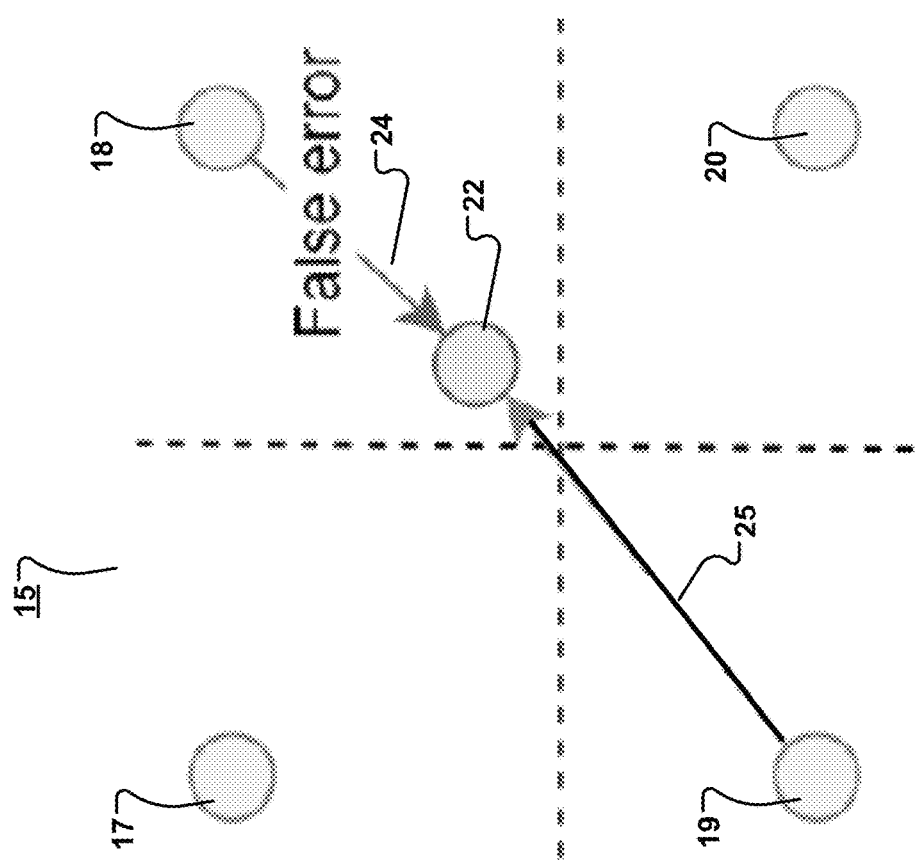
FIG. 2 is a constellation diagram showing an false error/symbol decoding error introduced into an EVM measurement by a constellation decoder.

In branch 41 of FIG. 4 and path 57 of FIG. 5 at block 58, process 40 determines (40d) a first EVM measurement/value for the symbol. "EVM" is used herein as shorthand for an EVM measurement or an EVM value. In this context, "first" does not have any numerical connotation, but rather is only used to distinguish the EVMs obtained in branch 41/path 57 from the EVMs obtained in branch 42/path 60 described below. The first EVM is based on the symbol 56 having RF noise added thereto and the symbol 53 without RF noise added thereto. Neither of these symbols includes false error introduced by the decoder. Referring to FIG. 2, for example, the symbol having no RF noise added thereto may be a symbol at location 19, and the symbol having RF noise added thereto may be a symbol at location 22. So, the EVM in this example is the magnitude of vector 25. This EVM is referred to as a "theoretical" EVM because it is the EVM that is obtained absent the false error introduced by the decoder.

At block 61, process 40 determines (40e) an average of first EVMs for the current power level (e.g., SNR power level). The average is used here in order to reduce or to eliminate the effects of EVMs outside the statistical norm.

The average of all or some first EVMs for a predefined power level is used by process 40 as a theoretical EVM 63 for the predefined power level. In this regard, in a case where a first EVM is the first value determined, that EVM begins the average. In a case where the first EVM is not the first value determined, the first EVM may be incorporated into a running average of prior first EVMs. Alternatively, all first EVMs may be determined and then the average of all of those first EVMs may be calculated.

In this example, process 40 determines (40*f*) if there is additional data—for example, symbols obtained through random sampling—to process for the current predefined power level to include in the average (40*e*). The amount of data to process for a predefined power level may be programmed into the decoder and/or the control system. For example, a user may program a number of symbols to be obtained through random sampling that are to be processed in order to obtain each theoretical EVM. This number may be the same or different for each power level. If there is additional data to process (40*f*), process returns to operation 40*a*, whereafter operations 40*b* to 40*f* are repeated for newly-received data representing a symbol for the power obtained through random sampling. If there is no additional data (e.g., additional symbols) to process (40*f*) for the power level, the theoretical EVM may be stored (40*g*) in memory in association with the corresponding predefined power level therefor.

The same data—for example, symbols—processed in branch 41/path 57 is (are) also processed in branch 42 of FIG. 4 and path 60 of FIG. 5 In some implementations, the processing performed in branch 41/path 57 may be performed in parallel with the processing performed in branch 42/path 60. For example, all or part of the processing performed in branch 41/path 57 may be performed at the same time as all or part of the processing performed in branch 42/path 60. In some implementations, the processing performed in branch 41/path 57 and branch 42/path 60 may be serial. For example, the processing performed branch 41/path 57 may be performed before the processing performed in branch 42/path 60 or vice versa.

In branch 42/path 60, at constellation decoder block 64 false error is also added (40*h*) to the symbol 56 having RF noise added thereto to produce symbol 65 having both the RF noise and the false error added thereto. In this example, constellation decoder block 54 may be a software module or routine that simulates hardware decoder 36 of FIG. 3 by implementing the same rules as decoder 36 to resolve potential errors in a constellation diagram, such as those described with respect to FIG. 2.

At block 66, process 40 determines (40*i*) a second EVM based on original symbol 53. In this context, "second" does not have any numerical connotation, but rather is only used to distinguish the EVMs obtained in branch 42/path 60 from the EVMs obtained in branch 41/path 57. The second EVM is based on the symbol 56 having RF noise added thereto and the symbol 65 having RF noise added thereto and containing the false error. Referring to FIG. 2, for example, the symbol 56 having RF noise added thereto may be at location 22, and the EVM corrupted by the false error may be the magnitude of vector 24 since the rule implemented by decoder 54 is to select a closest ideal symbol location 18 from which to determine the error vector 24 and thus the EVM. This EVM is referred to as a "simulation" EVM and is the EVM that is obtained based on both the RF noise and the false error introduced by decoder 54.

At block 68, process 40 determines (40*j*) an average of second EVMs for the current predefined power level. The average is used in order to reduce or to eliminate the effects of EVMs outside the statistical norm. Similar to branch 41/path 57, the average of all or some second EVMs for a predefined power level is used by process 40 as a simulation EVM 70 for the predefined power level. In this regard, in a case where a second EVM is the first value determined, that EVM begins the average. In a case where the second EVM is not the first value determined, the second EVM may be incorporated into a running average of prior second EVMs. Alternatively, all second EVMs may be determined and then the average thereof may be calculated.

As above, In this example, process 40 determines (40*f*) if there is additional data—for example, symbols obtained through random sampling—to process for a particular power level to include in the average (40*j*). If there is additional data to process (40*f*), process returns to operation 40*a*, whereafter operations 40*a* to 40*c*, 40*h* to 40*j*, and 40*f* are repeated for newly-received data representing a symbol for the power obtained through random sampling. If there is no additional data (e.g., additional symbols) to process (40*f*) for the power level, the simulation EVM may be stored (40*g*) in memory in association with the corresponding predefined power level therefor.

Process 40 determines (40*k*) if there are additional EVMs to obtain to generate the mapping function. For example, the mapping function may be based on, or require, pairs of theoretical and simulation EVMs for a predefined number of power levels. This predefined number of power levels may be compared with the number of power levels for which theoretical and simulation EVMs have been obtained in order to determine if additional EVMs need to be obtained. If additional EVMs are to be obtained (40*k*) based on the comparison, processing returns to operation 40*a*, where data is received. As described above, this data may be obtained by randomly sampling a data set from a predefined normal distribution of symbols for a new power level, Thereafter, operations 40*b* to 40*k* may be repeated one or more (e.g., multiple) times until there are no additional EVMs to obtain (40*k*).

Figure 10:
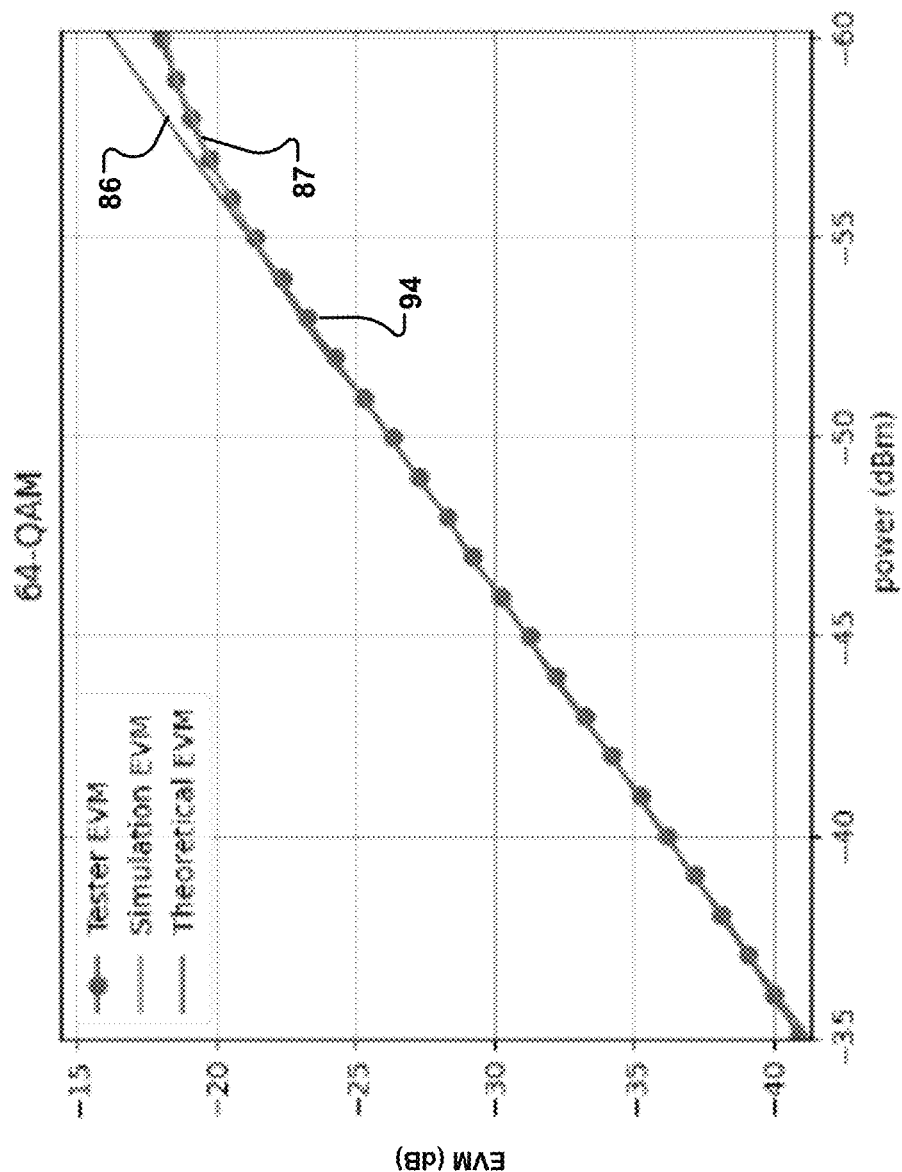
Figure 11:
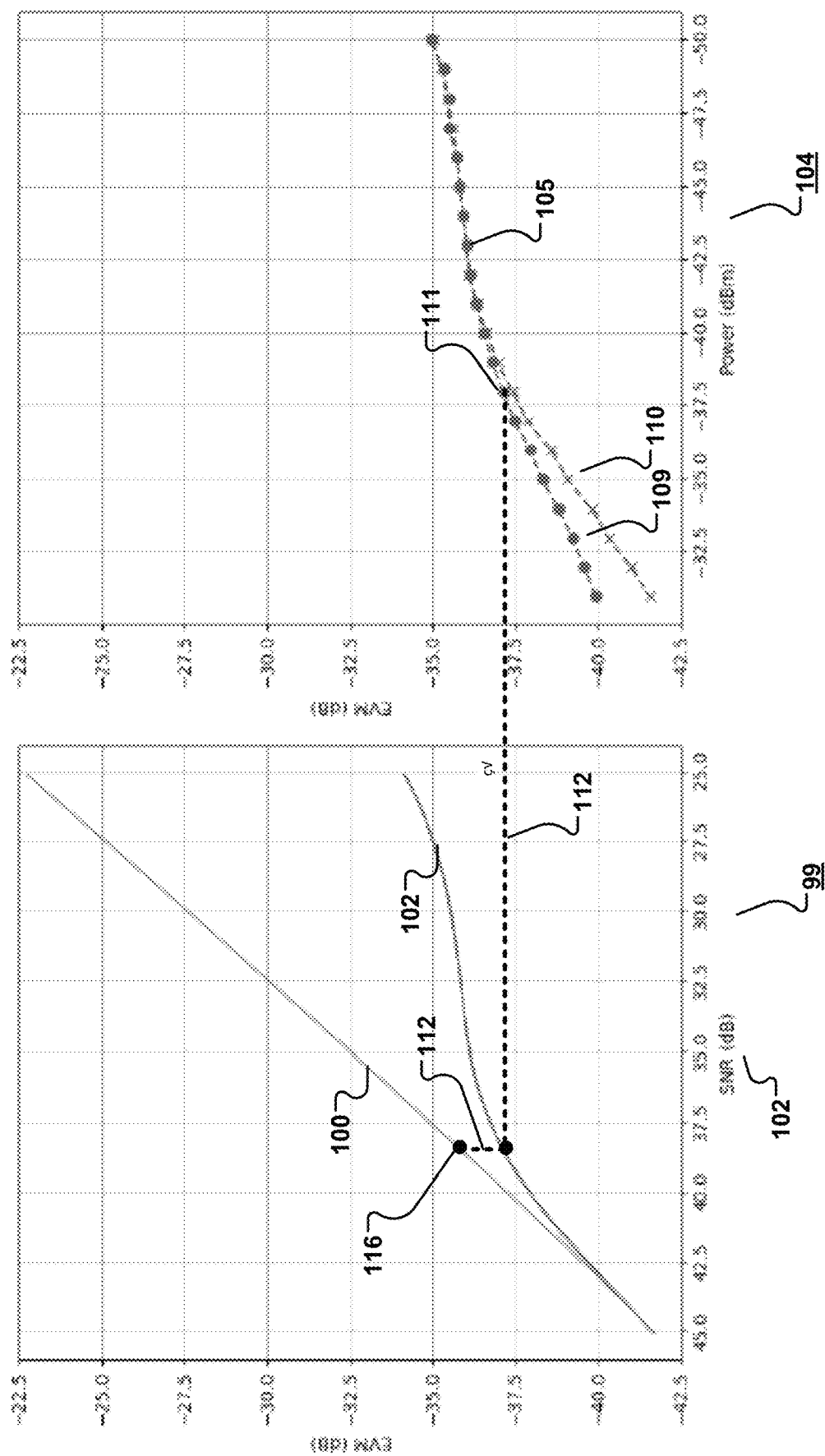
FIG. 11 are examples of graphs relating theoretical EVMs, simulation EVMs, and device under test (DUT) power levels.

Process 40 relates (40*l*) the theoretical EVMs and the simulation EVMs. For example, as shown in FIG. 11, the theoretical EVMs 100 and the simulation EVMs 102 may be plotted on a graph 99 over a range of power levels 102. Process 40 stores (40*f*) in memory a mapping function based on a relationship between the theoretical EVMs and the simulation EVMs, such as the relationships between the theoretical EVMs and the simulation EVMs shown graphically. In this regard, the example graphs of FIGS. 7 to 10 show similar plots for special cases where VSA noise dominates and does not change and, as a result, the VSG power sweep (e.g., range) is equivalent to the SNR power sweep for the signal for which the EVM is being measured.

The mapping function may be or include a single-step function, a multiple-step transfer function, one or more LUTs, or a combination thereof. In some implementations, the mapping function may be stored in memory 36*b* on decoder 36 (FIG. 3), where the mapping function may be used by decoder 36 to address false error in the manner described with respect to FIG. 6 below. In some implementations, the mapping function may be stored in memory 38*a* on control system 38, where the mapping function may be executed by the control system to control decoder 36 to address the false error in the manner described with respect to FIG. 6 below.

The mapping function may be stored in association with a type of encoding used to code the symbols. By way of example, quadrature amplitude modulation (QAM) may be used to code the symbols. QAM conveys two analog messages signals, or two digital bit streams, by changing—that is, by modulating—amplitudes of two carrier waves, using amplitude-shift keying (ASK) digital modulation or amplitude modulation (AM) analog modulation. Phase modulation and phase-shift keying (digital PSK) may be considered a special case of QAM, where the an plitude of the transmitted signal is a constant, but its phase varies. In QAM, constellation points may be arranged in a grid pattern having equal vertical and horizontal spacing. The number of points in the grid is typically a power of two, which corresponds to the number of bits per symbol. Process 40 may be used to generate mapping functions for different encodings.

More specifically, process 40 may be repeated using data sets encoded using different numbers of bits per symbol. For example, process 40 may be repeated a number of times, each time using as input data randomly sampled data from a normal distribution of data encoded using a different number of bits per symbol. Process may thus generate, and store in memory, a different or separate mapping function for each type of encoding. In the examples shown in FIGS. 7 to 10, process generates a relationship between theoretical EVMs 75 and simulation EVMs 76 for 4096-QAM modulation (FIG. 7), between theoretical EVMs 80 and simulation EVMs 81 for 1024-QAM modulation (FIG. 8), between theoretical EVMs 83 and simulation EVMs 84 for 256-QAM modulation (FIG. 9), and between theoretical EVMs 86 and simulation EVMs 87 for 64-QAM modulation (FIG. 10). Likewise, process 40 may generate, and store in memory, a different or separate mapping function like that shown in FIG. 11, where EVM is plotted against the SNR power sweep for, for example, 64-QAM modulation, 256-QAM modulation, 1024-QAM modulation, and 4096-QAM modulation. Process 40 may generate, and store in memory, a separate mapping function for any appropriate type of encoding. In some implementations, a single mapping function, such as a multi-step function, may address multiple different types of encodings. Note that the encodings of FIGS. 7 to 10 are examples only and that process 40 may be used with different-bit QAM modulations or with other types of encoding not described herein and generate mapping functions for each separate type of encoding as described herein.

Figure 6:
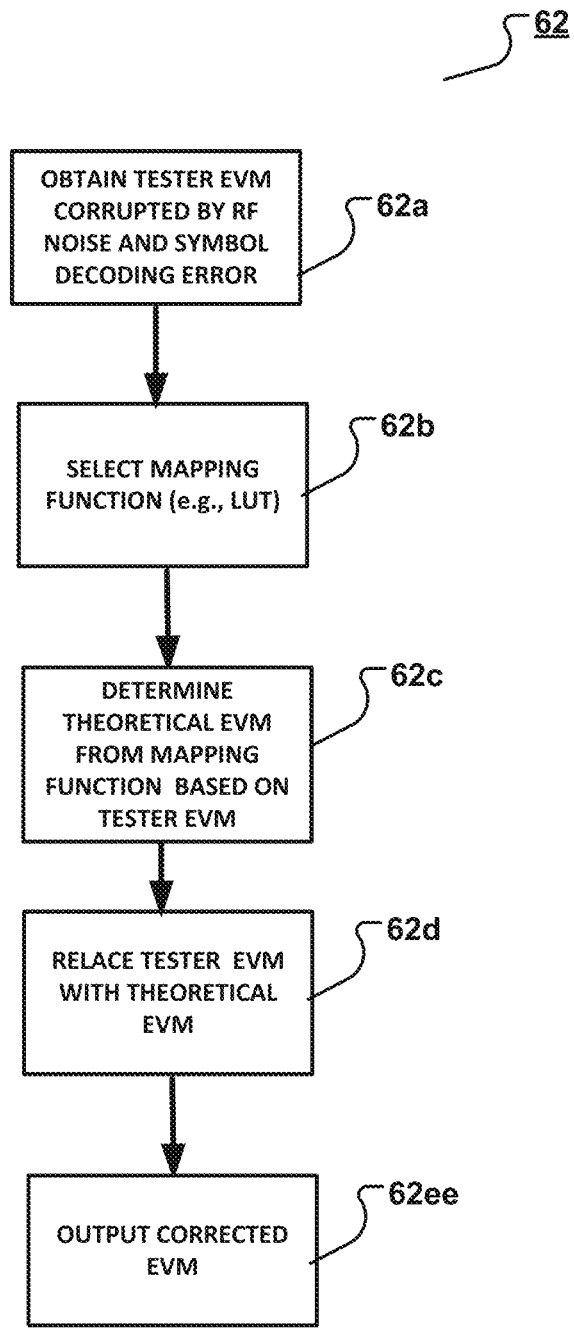
FIG. 6 is a flowchart showing an example process for addressing false error in an EVM measurement using the mapping function.
Figure 7:
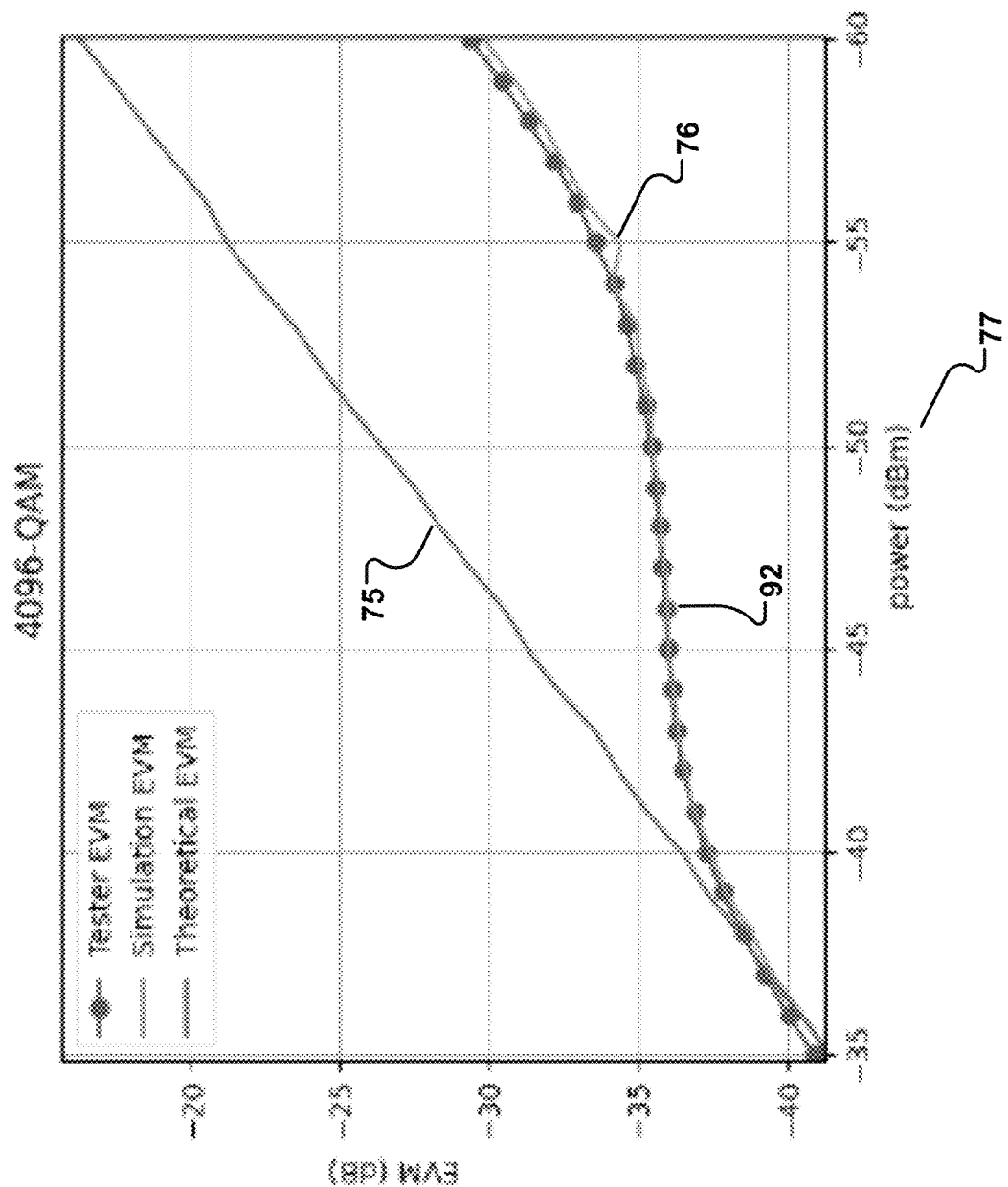
FIGS. 7 to 10 are examples of graphs relating theoretical EVMs, simulation EVMs, and tester EVMs for different quadrature amplitude modulations (QAMs).

FIG. 6 shows operations included in an example process 62 for addressing—for example, correcting at least in part—the false error in an EVM produced by decoder 36. In some examples, process 62 may be implemented by decoder 36, control system 38, or a combination of decoder 36 and control system 38. Process 62 includes obtaining (62a) from decoder 36 during a testing process, an EVM (referred to as a "tester EVM") for a symbol from a signal obtained from a DUT being tested, where that symbol is corrupted by both RF noise and false error. Process 62 includes selecting (62b) a mapping function, such as a LUT, based on the type of encoding used by the symbol(s) that produce the tester EVM. For example, if the symbols are 1024-QAM-modulated, the tester may select a LUT that reflects the relationship between the theoretical EVM and the simulation EVM shown in FIG. 8. Process 62 may identify the type of encoding used, for example, based on the number of bits received per symbol.

Process 62 determines a theoretical EVM using the mapping function based on the tester EVM. For example, in plot 104 of FIG. 11 for a particular DUT 109, the tester EVM data points 105 may closely track the simulation EVM 102 curve for at least part of the curves, which is an indicator that the simulation was accurate for at least that part of the curve.

Tester EVM data points 92, 90, 93, and 94 are also shown, respectively, for 4096-QAM modulation (FIG. 7), for 1024-QAM modulation (FIG. 8), for 256-QAM modulation (FIG. 9), and for 64-QAM modulation (FIG. 10).

In this example, process 62 selects (62b) a mapping function such as a LUT for 1024-QAM modulation or a mapping function that addresses multiple types of encoding including 1024-QAM modulation. Process 62 determines (62c) a theoretical EVM, which is a corrected or adjusted version of the tester EVM, using the mapping function based on the tester EVM. In the example shown in FIG. 11, referring to plot 104 showing data for two DUTs 109, 110, if the tester EVM 111 is −37 dB at an SNR power level of −38 dBm power, following lines 112 and 113, the corresponding theoretical EVM 116 is about −36 dB. This theoretical EVM 116 corresponds to-for example, is equal to or is an estimate of-the tester EVM 111 having the false error introduced by the decoder removed. Accordingly, process 62 adjusts the tester EVM by replacing (62d) the tester EVM (e.g., EVM 111) with the theoretical EVM (e.g., EVM 116), thereby addressing the false error in the tester EVM. The resulting false-error-corrected EVM is output (62e), for example, from decoder 36 to control system 38, where computer code (e.g., machine-executable instructions) may be executed to implement functionality such as correcting for noise or other sources of corruption in the false-error-corrected EVM.

Figure 8:
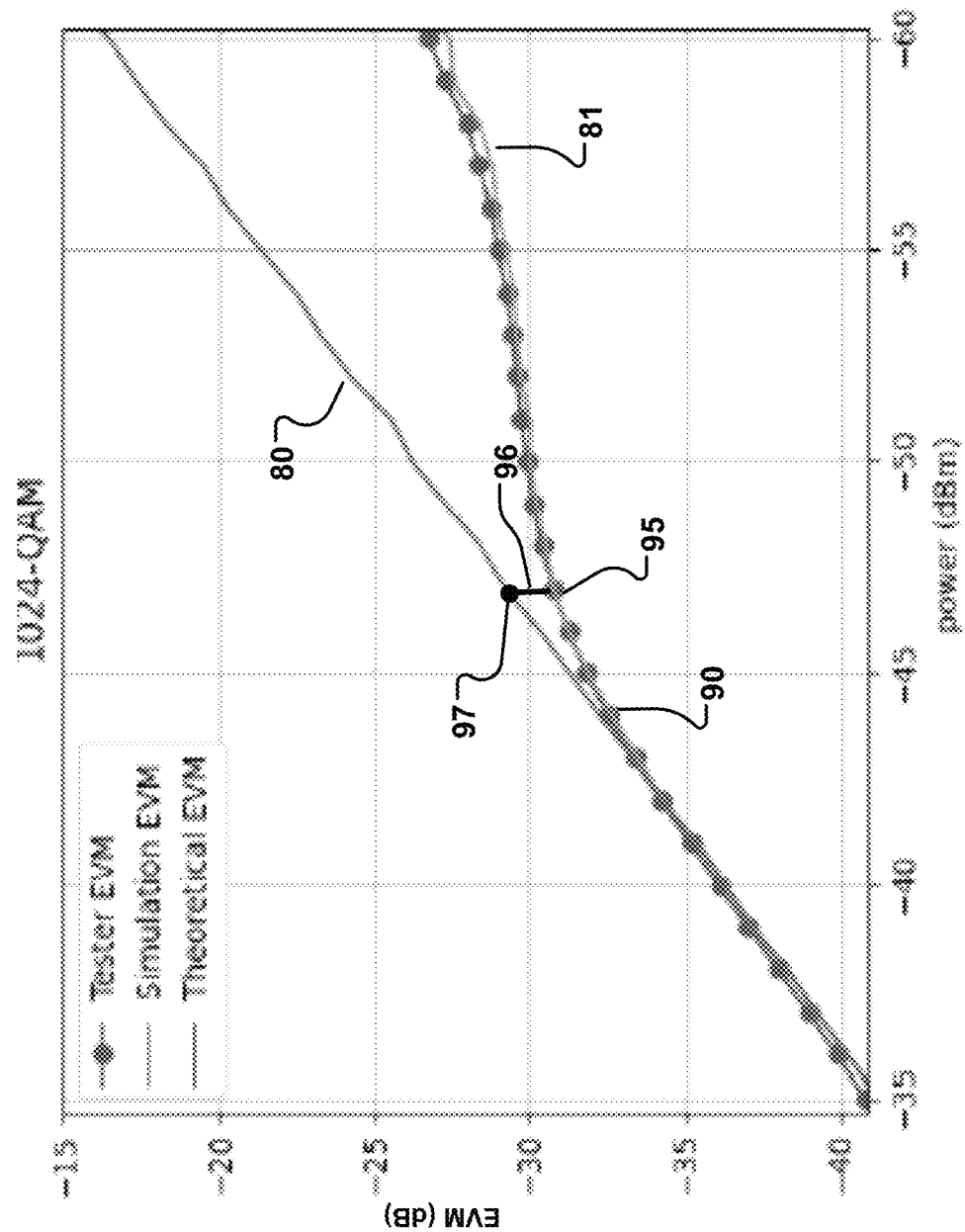
Figure 9:
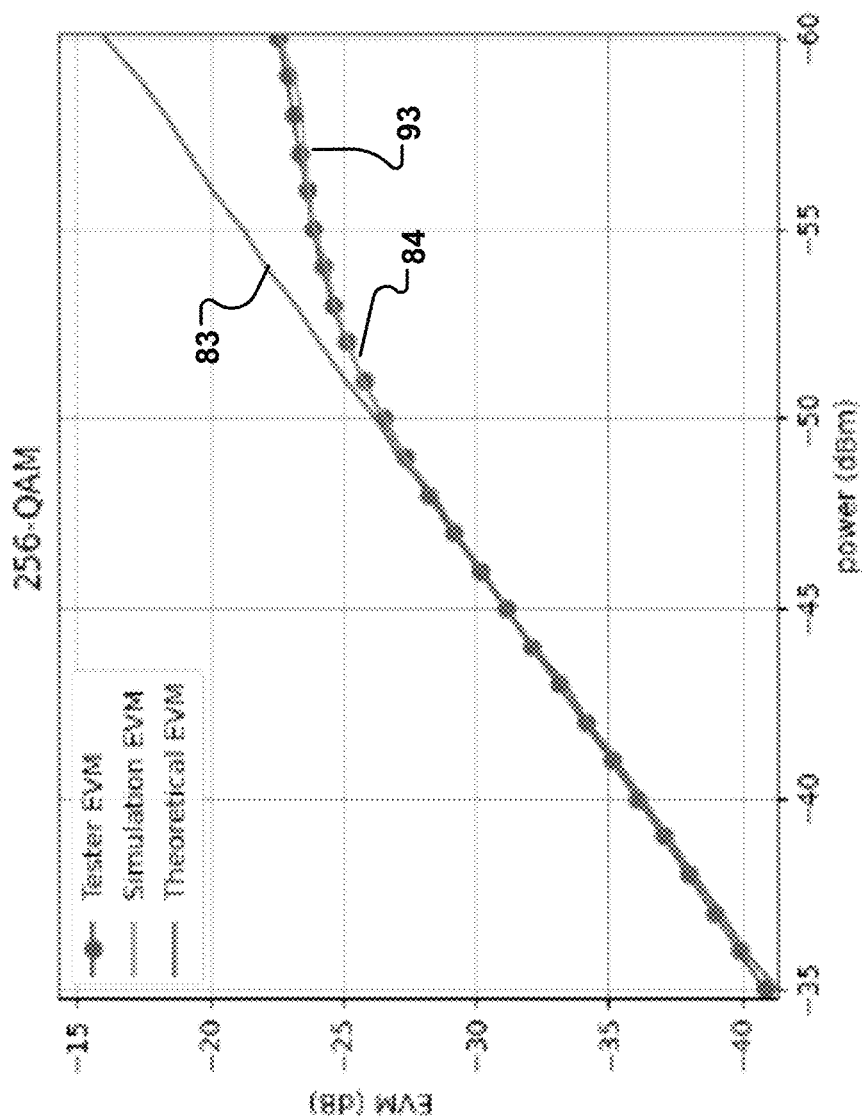

In another example shown in FIG. 8, if the tester EVM 95 is −30 dB at a −50 dBm power, following line 96, the corresponding theoretical EVM 97 is about −26 dB. This theoretical EVM 97 corresponds to—for example, is equal to or is an estimate of—the tester EVM 95 having the false error introduced by the decoder removed. Accordingly, process 62 adjusts the tester EVM by replacing (62d) the tester EVM (e.g., EVM 95) with the theoretical EVM (e.g., EVM 97), thereby addressing the false error in the tester EVM. The resulting false-error-corrected EVM is output (62e), for example, from decoder 36 to control system 38, where computer code (e,g., machine-executable instructions) may be executed to implement functionality such as correcting for noise or other sources of corruption in the false-error-corrected EVM.

All or part of the systems and processes described in this specification and their various modifications may be configured or controlled at least in part by one or more computers such as control system 38 using one or more computer programs tangibly embodied in one or more information carriers, such as in one or more non-transitory machine-readable storage media. A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with configuring or controlling the test system and processes described herein can be performed by one or more programmable processors executing one or more computer programs to control or to perform all or some of the operations described herein. All or part of the test systems and processes can be configured or controlled by special purpose logic circuitry, such as, an FPGA (field programmable gate array) and/or an ASIC (application-specific integrated circuit) or embedded microprocessor(s) localized to the instrument hardware.

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, such as magnetic, magneto-optical disks, or optical disks. Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

Other implementations not specifically described in this specification are also within the scope of the following claims.

What is claimed is:

1. A method for use with symbols from encoding that is based on an amplitude and a phase of a carrier signal, the method comprising:
    generating a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors;
    obtaining a third EVM for a second symbol, the third EVM being corrupted by both RF noise and a symbol decoding error; and
    adjusting the third EVM using the mapping function to correct the symbol decoding error in the third EVM.

2. The method of claim 1, wherein the mapping function comprises a look-up table (LUT) relating the first EVMs to the second EVMs for a type of encoding; and
    wherein adjusting the third EVM comprises selecting the LUT, selecting a second EVM in the LUT based on the third EVM, and replacing the third EVM with the first EVM corresponding to the selected second EVM.

3. The method of claim 2, wherein the type of encoding comprises quadrature amplitude modulation.

4. The method of claim 1, wherein the mapping function is based on a simulation configured to perform operations comprising:
    determining first values corresponding to the first EVMs based on versions of the first symbols that are uncorrupted by RF noise and versions of the first symbols that are corrupted by the RF noise;
    averaging sets of the first values to produce each first EVM;
    determining second values corresponding to the second EVMs based on the versions of the first symbols that are corrupted by the RF noise and versions of the first symbols that are corrupted by both the RF noise and the symbol decoding error; and
    averaging sets of the second values to produce each second EVM.

5. The method of claim 4, wherein determining each first value comprises:
    adding RF noise to a select first symbol; and
    determining a first value based on the select first symbol and the select first symbol with RF noise added, the first value being an EVM for the select first symbol that would occur without a symbol decoding error.

6. The method of claim 5, wherein adding the RF noise comprises:
    selecting random noise from a Gaussian distribution of noise; and
    combining the random noise with the select first symbol.

7. The method of claim 5, wherein determining each second value comprises:
    adding a symbol decoding error to the select first symbol with RF noise added; and
    determining a second value based on the select first symbol with RF noise added and the select first symbol with both RF noise added and symbol decoding error, the second value being an EVM for the select first symbol that would be occur with the symbol decoding error.

8. The method of claim 7, wherein the symbol decoding error comprises false error that is based on one or more rules applied by a constellation decoder configured to decode symbols.

9. The method of claim 7, wherein at least one of the rules requires selection of a shortest error vector between an ideal symbol location on a constellation and the select first symbol with RF noise added.

10. The method of claim 1, wherein the first symbols are obtained by randomly sampling a data set from a normal distribution.

11. The method of claim 1, further comprising:
    storing the mapping function in a constellation decoder where the third EVM is adjusted.

12. A method of generating a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors, the method comprising:
    determining first values corresponding to the first EVMs based on versions of the first symbols that are uncorrupted by RF noise and versions of the first symbols that are corrupted by the RF noise;
    averaging sets of the first values to produce each first EVM;
    determining second values corresponding to the second EVMs based on the versions of the first symbols that are corrupted by the RF noise and versions of the first symbols that are corrupted by both the RF noise and the symbol decoding error;
    averaging sets of the second values to produce each second EVM; and
    relating the first EVMs and the second EVMs.

13. The method of claim 12, wherein the first symbols are obtained by randomly sampling a data set from a normal distribution; and wherein the method comprises determining the versions of the first symbols that are uncorrupted by the RF noise by adding the RF noise to the first symbols.

14. The method of claim 13, wherein adding the RF noise comprises:

selecting random noise from a Gaussian distribution of noise; and combining the random noise with each first symbol.

15. One or more non-transitory machine readable media storing instructions that are executable by one or more processing devices to implement a method for use with symbols from encoding that is based on an amplitude and a phase of a carrier signal, the instructions being executable to perform operations comprising:

generating a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors;

obtaining a third EVM for a second symbol, the third EVM being corrupted by both RF noise and a symbol decoding error; and adjusting the third EVM using the mapping function to correct the symbol decoding error in the third EVM.

16. The one or more non-transitory machine readable media of claim 15, wherein the mapping function comprises a look-up table (LUT) relating the first EVMs to the second EVMs for a type of encoding; and wherein adjusting the third EVM comprises selecting the LUT, selecting a second EVM in the LUT based on the third EVM, and replacing the third EVM with the first EVM corresponding to the selected second EVM.

17. The one or more non-transitory machine readable media of claim 16, wherein the type of encoding comprises quadrature amplitude modulation.

18. The one or more non-transitory machine readable media of claim 15, wherein the mapping function is based on a simulation configured to perform operations comprising:

determining first values corresponding to the first EVMs based on versions of the first symbols that are uncorrupted by RF noise and versions of the first symbols that are corrupted by the RF noise;

averaging sets of the first values to produce each first EVM;

determining second values corresponding to the second EVMs based on the versions of the first symbols that are corrupted by the RF noise and versions of the first symbols that are corrupted by both the RF noise and the symbol decoding error; and averaging sets of the second values to produce each second EVM.

19. The one or more non-transitory machine readable media of claim 18, wherein determining each first value comprises:

adding RF noise to a select first symbol; and determining a first value based on the select first symbol and the select first symbol with RF noise added, the first value being an EVM for the select first symbol that would occur without a symbol decoding error.

20. The one or more non-transitory machine readable media of claim 19, wherein adding the RF noise comprises:

selecting random noise from a Gaussian distribution of noise; and combining the random noise with the select first symbol.

21. The one or more non-transitory machine readable media of claim 19, wherein determining each second value comprises:

adding a symbol decoding error to the select first symbol with RF noise added; and determining a second value based on the select first symbol with RF noise added and the select first symbol with both RF noise added and symbol decoding error, the second value being an EVM for the select first symbol that would be occur with the symbol decoding error.

22. The one or more non-transitory machine readable media of claim 21, wherein the symbol decoding error comprises false error that is based on one or more rules applied by a constellation decoder configured to decode symbols.

23. The one or more non-transitory machine readable media of claim 21, wherein at least one of the rules requires selection of a shortest error vector between an ideal symbol location on a constellation and the select first symbol with RF noise added.

24. The one or more non-transitory machine readable media of claim 15, wherein the first symbols are obtained by randomly sampling a data set from a normal distribution.

25. The one or more non-transitory machine readable media of claim 15, wherein the operations comprise:

storing the mapping function in a constellation decoder where the third EVM is adjusted.

26. One or more non-transitory machine readable media storing instructions that are executable by one or more processing devices to implement a method of generating a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors, the instructions being executable to perform operations comprising:

determining first values corresponding to the first EVMs based on versions of the first symbols that are uncorrupted by RF noise and versions of the first symbols that are corrupted by the RF noise;

averaging sets of the first values to produce each first EVM;

determining second values corresponding to the second EVMs based on the versions of the first symbols that are corrupted by the RF noise and versions of the first symbols that are corrupted by both the RF noise and the symbol decoding error;

averaging sets of the second values to produce each second EVM; and relating the first EVMs and the second EVMs.

27. The one or more non-transitory machine readable media of claim 26, wherein the first symbols are obtained by randomly sampling a data set from a normal distribution; and wherein the operations comprise determining the versions of the first symbols that are corrupted by the RF noise by adding the RF noise to the first symbols.

28. The one or more non-transitory machine readable media of claim 27, wherein adding the RF noise comprises:
- selecting random noise from a Gaussian distribution of noise; and
- combining the random noise with each first symbol.

29. A test system comprising:
- memory storing (i) instructions that are executable, and (ii) a mapping function that relates first error vector magnitudes (EVMs) for first symbols to second EVMs for the first symbols, where the first EVMs are corrupted by radio frequency (RF) noise and the second EVMs are corrupted by both RF noise and symbol decoding errors;
- a decoder to receive a signal from a device under test, the decoder to obtain a third EVM for a second symbol that is based on the signal, the third EVM being corrupted by both RF noise and a symbol decoding error; and
- one or more processing devices to execute the instructions to adjust the third EVM using the mapping function to correct the symbol decoding error in the third EVM.

30. The test system of claim 29, wherein the third EVM is based on a symbol decoding error added by the decoder, the symbol decoding error being based on at least one predefined rule implemented by the decoder.

* * * * *